United States Patent
Illner et al.

(10) Patent No.: US 7,413,823 B2
(45) Date of Patent: Aug. 19, 2008

(54) METHOD FOR MONITORING THE DISCHARGE OF MEDIA OUT OF FUEL CELL, AND A FUEL CELL SYSTEM

(75) Inventors: Dieter Illner, Erlangen (DE); Igor Mehltretter, Buckenhof (DE); Ottmar Voitlein, Lonnerstadt (DE)

(73) Assignee: Siemens Aktiengesellschaft, Munich (DE)

( * ) Notice: Subject to any disclaimer, the term of this patent is extended or adjusted under 35 U.S.C. 154(b) by 471 days.

(21) Appl. No.: 10/380,970

(22) PCT Filed: Sep. 10, 2001

(86) PCT No.: PCT/DE01/03472

§ 371 (c)(1), (2), (4) Date: Mar. 21, 2003

(87) PCT Pub. No.: WO02/27848

PCT Pub. Date: Apr. 4, 2002

(65) Prior Publication Data

US 2003/0190502 A1    Oct. 9, 2003

(30) Foreign Application Priority Data

Sep. 22, 2000  (DE) ................................ 100 47 173

(51) Int. Cl.
H01M 8/04 (2006.01)
H01M 8/12 (2006.01)

(52) U.S. Cl. .............................. 429/25; 429/13; 429/22

(58) Field of Classification Search ............. 429/12, 429/20, 39, 22, 25, 13
See application file for complete search history.

(56) References Cited

U.S. PATENT DOCUMENTS 4,407,903 A     10/1983  Gutbier et al.
5,192,627 A *   3/1993   Perry et al. ................. 429/17
6,502,467 B1 *  1/2003   Fincke ...................... 73/861.63

FOREIGN PATENT DOCUMENTS

CA          2048674          7/1990

(Continued)

OTHER PUBLICATIONS

Patent Abstract of Japan; JP 07230817; Aug. 29, 1995; "Solid High Polymer Electrolyte Fuel Cell"; © 19985 JPO.

*Primary Examiner*—Patrick Ryan
*Assistant Examiner*—Ben Lewis
(74) *Attorney, Agent, or Firm*—Harness, Dickey & Pierce, P.L.C.

(57) ABSTRACT

A defective operation of a valve (15, 35, 37, 39) in a drainage line (13, 21, 31, 33) of a fuel cell results in unintentionally permitting process gas to flow into the surrounding area of the fuel cells. In order to resolve this problem, the invention provides a method for monitoring the discharge of media out of a fuel cell and provides a fuel cell system, with which the gas and water stream flowing through the drainage line (25, 41) is monitored (65) by means of a Venturi nozzle (23, 40) that is connected to a differential pressure sensor (27, 53). The magnitude (67) and the temporal progression (69) of the differential pressure indicated by the differential pressure sensor (27, 53) establishes the basis for controlling the valve (15, 35, 37, 39) in the drainage line (13, 21, 31, 33) and for shutting down (71) the fuel cell block (1) in the event that the valve (15, 35, 37, 39) is defective.

14 Claims, 2 Drawing Sheets

FOREIGN PATENT DOCUMENTS

Figure 1:
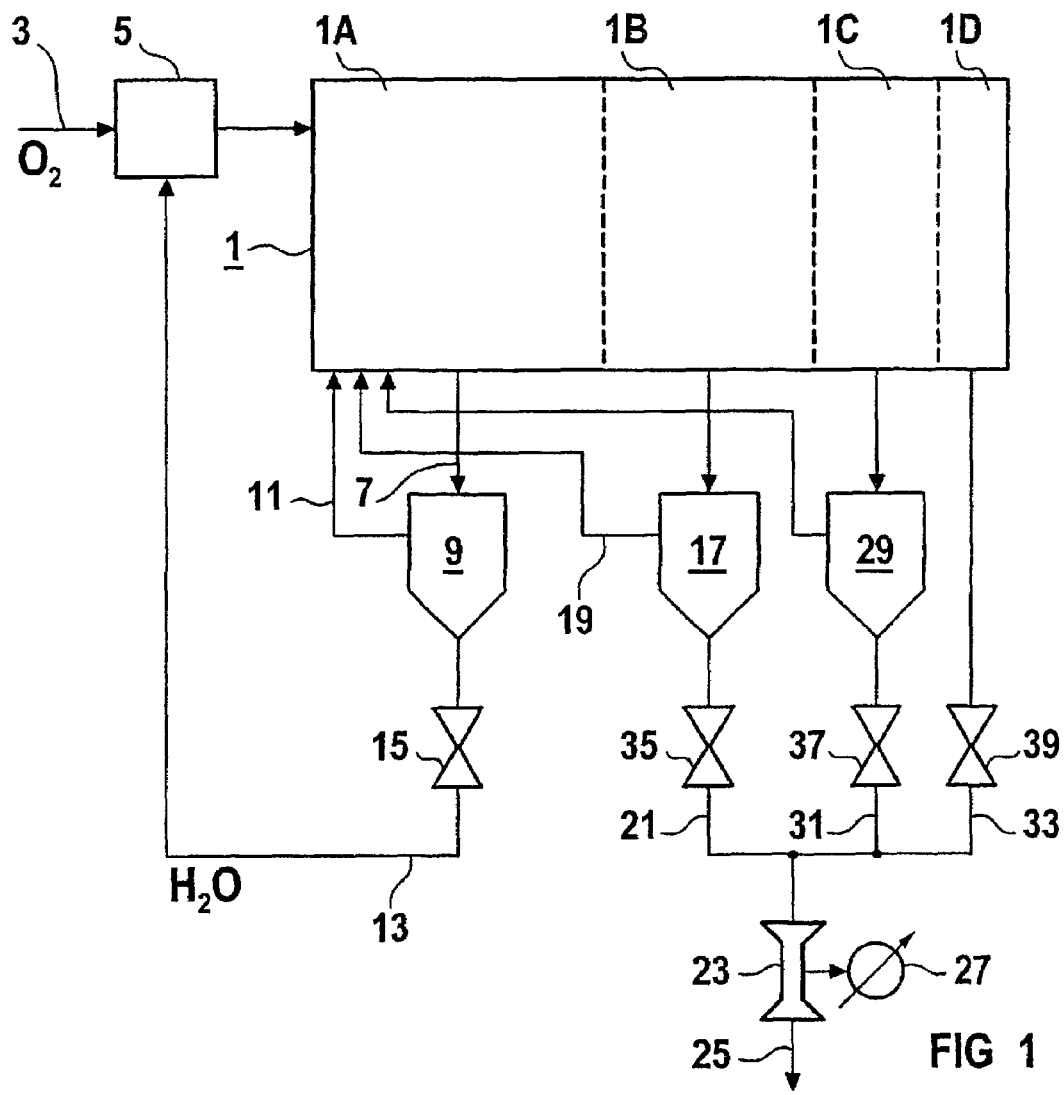

| | | |
|---|---|---|
| EP | 0596366 | 11/1992 |
| JP | 51-28631 | 3/1976 |
| JP | OS 57-111963 | 5/1982 |
| JP | OS 62-165870 | 7/1987 |
| JP | OS 02-227962 | 9/1990 |
| JP | AS 53-023490 | 12/1993 |
| JP | OS 06-203862 | 5/1994 |

* cited by examiner

METHOD FOR MONITORING THE DISCHARGE OF MEDIA OUT OF FUEL CELL, AND A FUEL CELL SYSTEM

The invention relates to a method for monitoring the discharge of media out of a fuel cell, and to a fuel cell system.

In a fuel cell, electrical energy and heat are generated by combining hydrogen ($H_2$) and oxygen ($O_2$) in an electrochemical reaction. For this purpose, hydrogen and oxygen, either in pure form or as fuel gas with a hydrogen content and as air, are fed to the fuel cell. The hydrogen is passed into an anode gas space, where it sweeps along an anode and, on account of the porous structure of the latter, can penetrate through the anode and reach an electrolyte below it. The oxygen is passed into a cathode gas space, where it sweeps along a cathode and passes through the porous structure of the cathode, likewise to the electrolyte lying below the cathode, but on the opposite side of the electrolyte from the hydrogen. Therefore, on one side of the electrolyte, which is of sheet-like design, there is hydrogen and on the other side of the electrolyte there is oxygen. Depending on the type of electrolyte, it is now possible for oxygen or hydrogen to penetrate through the electrolyte. For example, if the fuel cell is a PEM fuel cell, PEM being the abbreviation for polymer electrolyte membrane or proton exchange membrane, the hydrogen can penetrate through the electrolyte. It reacts with the oxygen at the cathode to form water (H2O), with electrical energy and heat being released.

This water which forms in the cathode gas space is discharged from the fuel cell together with the gas stream and is separated from the gas stream in a water separator. If the gas flow through the fuel cell is not sufficient to discharge the water, the water accumulates in the cathode gas space of the fuel cell and therefore floods this cell over the course of time. The same is also true of the anode gas space of the fuel cells in which humidification water, which is added to the hydrogen to humidify it before it enters the cells, accumulates.

It is known from EP 0 596 366 B1 to discharge water from the flooded fuel cell or a water separator through a drainage line. This is achieved by opening a controllable valve, allowing the product water to flow out of the fuel cell or forcing the product water out of the fuel cell by means of the excess pressure which prevails in the fuel cell, and closing the valve again. However, the problem in this context is that if the valve is defective and no longer closes, large amounts of oxygen or hydrogen escape from the fuel cell block.

Therefore, the object of the present invention is to provide a method for monitoring the discharge of gases and water—also referred to below as media—out of a fuel cell which makes it possible to effectively prevent undesirable quantities of a gas from flowing out of a fuel cell. Moreover, the object of the present invention is to provide a fuel cell system which has a device for reliably monitoring a discharge of media through a line.

The object relating to the method is achieved by a method for monitoring the discharge of media from a fuel cell, in which, according to the invention, after the fuel cell has been drained through a line, the line is closed by means of a valve, the flow in the line is measured with the aid of a means for measuring the differential pressure at a venturi nozzle and, if the differential pressure is above a limit pressure, the fuel cell is shut down.

A venturi nozzle is formed by a constriction in the cross section of a line and a subsequent widening of the cross section to the same extent. A liquid or a gas which flows through the venturi nozzle is accelerated as it flows through that section of the venturi nozzle in which the line cross section narrows, which leads to a pressure drop within the liquid or the gas at the narrowest location in the venturi nozzle. A differential-pressure sensor measures the difference in pressure of the liquid or gas upstream of and, for example, at the narrowest point in the venturi nozzle. The differential pressure is a measure of the flow of the liquid or gas through the venturi nozzle.

Therefore, by monitoring the differential pressure, it is possible to determine when a medium is flowing through the line and when it is not. It is therefore also possible to determine whether and when the valve closes the drainage line or whether, for example as a result of a defect in the valve, it is leaking or simply does not close at all. If, at a time at which the valve should be closed, a differential pressure which is higher than a limit pressure is measured, it can be assumed that the valve is leaking or is not closed at all. An undesirable discharge of gas from the fuel cell or the fuel cell block is effectively prevented by shutting down the fuel cell or the entire fuel cell block to which the drainage line belongs.

The object relating to the method is also achieved by a method for monitoring the discharge of media out of a fuel cell in which, according to the invention, while the fuel cell is being drained, a change from a stream of water to a stream of gas through a venturi nozzle is detected by monitoring the differential pressure at the venturi nozzle, and a line is closed by means of a valve after gas has started to pass through it.

A venturi nozzle is not only a flow-monitoring means which is suitable for a phase, for example gases. A venturi nozzle can also be used to detect when the fuel cell has been drained and gas is then flowing through the drainage line. At the time at which a phase boundary passes the venturi nozzle, for example from liquid to gas, or alternatively from gas to liquid, the differential pressure undergoes a sudden change. A phase change during the drainage of a fuel cell is clearly detected on the basis of, for example, this sudden change in the differential pressure. Therefore, the venturi nozzle, by interacting with the differential-pressure sensor, acts as a closure indicator for the valve. This effectively prevents undesirable quantities of gas from flowing out through the drainage line.

The valve is expediently only closed a fixed time after gas has started to pass through it. In general, a certain quantity of inert gas needs to be discharged from the fuel cell as well as the product water. Therefore, the time at which the valve is to be closed is set at a defined time after the phase change has occurred. As a result, by way of example, first of all the product water and then a certain quantity of inert gas are discharged from the fuel cell before the valve is closed. Moreover, the venturi nozzle monitors the reliable closure of the valve and the fuel cell is shut down in the event of a fault in the valve. The length of the time period may, for example, be selected to be constant, so that after each drainage operation gas flows out of the fuel cell through the drainage line over a constant period of time. However, the period of time may also be dependent on the quantity of water which leaves the fuel cell during the drainage operation.

The quantity of water can be calculated from the flow of water through the venturi nozzle, i.e. from the differential pressure, and from the duration of the flow of water.

The second object is achieved by a fuel cell system which, according to the invention, has a fuel cell block with a line in which there is a venturi nozzle with a differential pressure sensor.

A venturi nozzle in combination with a differential pressure sensor is a flow-monitoring means which is suitable for reliably indicating the flow in a line. An undesirable passage of gas through, for example, a drainage line is therefore reliably detected. The advantage of a venturi nozzle resides in particular in the fact that it is not sensitive to a two-phase mixture flowing through it. The pressure in a fuel cell block is usually a few bar above that of the outside atmosphere. Therefore, water and gas are forced through the venturi nozzle at a great speed. It has been found that other flow-monitoring means, such as for example a floating flow-monitoring means, are damaged very quickly if a two-phase mixture flows through them at high speed. For example, if a floating flow-monitoring means has gas flowing through it for a short time followed by water, the float is moved so suddenly by the impact of the water that the flow-monitoring means is destroyed after only short operating times. A venturi nozzle is free from wear in particular through the fact that it does not have any moving parts and is particularly suitable for monitoring flow in a two-phase mixture. Moreover, it operates without dynamic feedback.

In addition to its robustness, the venturi nozzle also has the property of being able to detect extremely low levels of flow. This is attributable to the function of the venturi nozzle of increasing the differential pressure: the differential pressure between the pressure upstream of the nozzle and the pressure at the narrowest location of the nozzle is greater than the differential pressure between the pressure upstream of the nozzle and the pressure downstream of the nozzle. Therefore, even slight leaks in the closure valve for the drainage line can be detected with the aid of a venturi nozzle.

Moreover, a venturi nozzle has further benefits compared to other flow-monitoring means: it produces only a low level of back-pressure in the drainage line through recovery of the kinetic energy within the nozzle. Therefore, it operates without a great pressure loss. Moreover, a venturi nozzle can withstand or even measure very different levels of flow. It is very unlikely to be overloaded. If the differential-pressure sensor of a venturi nozzle is designed, for example, to measure low levels of flow which generate a differential pressure of 10 mbar, the sensor can nevertheless withstand pressure waves of, for example, 4 bar.

The line is advantageously a drainage line. This results in reliable monitoring of the drainage of a fuel cell without an undesirably large amount of gas being discharged.

Alternatively, the line may be an operating-gas line. Of course, a venturi nozzle can also be used in lines other than just the drainage line within a fuel cell system. For example, a venturi nozzle may be fitted in the operating-gas feed line leading to a fuel cell block. Therefore, a differential pressure sensor can be used to monitor the operating-gas flow and to set this flow to an optimum rate. Moreover, it is also possible for a venturi nozzle to be installed in the outlet line for exhaust gas or inert gas from the fuel cell block. It is therefore possible to measure how much gas is discharged from the fuel cell block. The operating mode of the fuel cell block can be optimized with the aid of this measurement. A venturi nozzle is also suitable for installation between individual cascade stages of a cascaded fuel cell block. This allows the fuel gas consumption of the individual cascade stages to be determined and the operating mode of the fuel cell block to be adapted accordingly.

In an advantageous configuration of the invention, the fuel cell block is a closed fuel cell block. A block of this type is also known as a dead end block. A closed fuel cell block is distinguished by the fact that it is designed to operate substantially without exhaust gas, using pure hydrogen ($H_2$) and pure oxygen ($O_2$). Hydrogen and oxygen are completely consumed and converted into water as they pass through the fuel cells. Therefore, a fuel cell block of this type does not have an exhaust pipe, but rather only has one or more drainage lines, through which product water and humidification water and also a certain quantity of residual gases, such as inert gases and contaminating gases from the hydrogen and oxygen gases, can be discharged from the block. A fuel cell block of this type is therefore designed in such a way that only a small amount of gas leaves it. Therefore, particularly accurate control of the drainage and of the disposal of the residual gases is especially important. The fact that the venturi nozzle functions as a closure indicator and as a valve-monitoring means allows control of this nature to be carried out easily and reliably with the aid of the venturi nozzle.

The invention can advantageously be used as a general-purpose feature in all fuel cell systems. It is particularly advantageous in low-temperature fuel cells, such as for example PEM (Polymer Electrolyte Membrane) fuel cells, especially in the mobile sector, such as in motor vehicles or other vehicles. For example, the invention is particularly advantageously used in a fuel cell system for supplying power to an electrical unit in a submarine. Very particular demands are imposed on a fuel cell system in a submarine. For example, a fuel cell system of this type must only emit extremely small amounts of exhaust gases, since these gases do not leave the submarine, but rather remain in the submarine. Therefore, very reliable monitoring of the quantity of gas discharged from a fuel cell block through a drainage line is absolutely imperative. Its safe, wear-free and reliable operation therefore makes a venturi nozzle particularly suitable for use in a submarine. A second particular demand imposed on a fuel cell system in a submarine is that it must operate with extremely low noise levels. A flow-monitoring means with moving parts inevitably produces clicking noises in a two-phase mixture which is forced through the flow-monitoring means at high speed. It is inevitable that these noises will also be transmitted to the outer cladding of the submarine. They can then be identified by means of special equipment on submarine hunters: the submarine can therefore be located. Since a venturi nozzle does not have any moving parts and also does not produce any particular turbulent flows in the two-phase mixture, it works without any clicking or gurgling noises. It can therefore be used to carry out noiseless monitoring of the fuel cell block.

A further advantage is achieved if the unit is a drive unit of the submarine. A fuel cell system which is used to supply power to a drive unit of the submarine has to have a high output. It therefore generates large amounts of product water. Since a venturi nozzle, irrespective of its size, always operates without noise, accurately and without wear, even irrespective of the amount of water passing through it, it is particularly suitable for use in large fuel cell systems in a submarine.

The fuel cell system expediently has PEM fuel cells. Large amounts of water circulate in fuel cells of this type, since the electrolyte of each fuel cell has to be kept moist. Moreover, it is operated at low temperatures of up to 100° C. and at pressures of up to 5 bar.

All these operating conditions are such that the venturi nozzle can reveal its full range of advantages. In a PEM fuel cell, the product water is produced on the cathode side. Therefore, the venturi nozzle is preferably used on the cathode side of a PEM fuel cell block.

However, water is also produced on the anode side, since the hydrogen, like the oxygen, also has to be 100% humidified before it enters the fuel cells. This water may condense out under certain circumstances and may therefore also flood the anode side of a fuel cell. Therefore, it is also recommended to use a venturi nozzle for the drainage of the anode part of a fuel cell block, since there too there is a two-phase mixture which has to be discharged from the fuel cell block.

Figure 2:
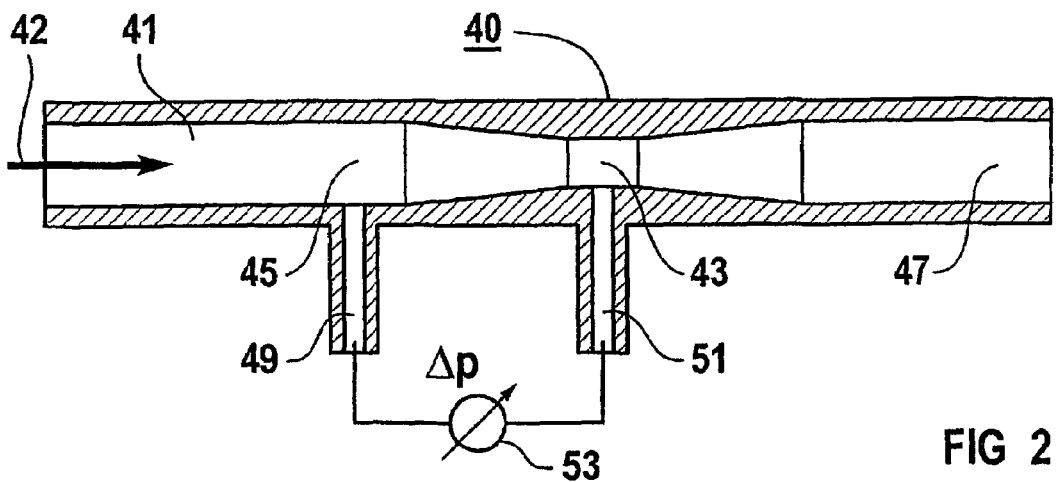
Figure 3:
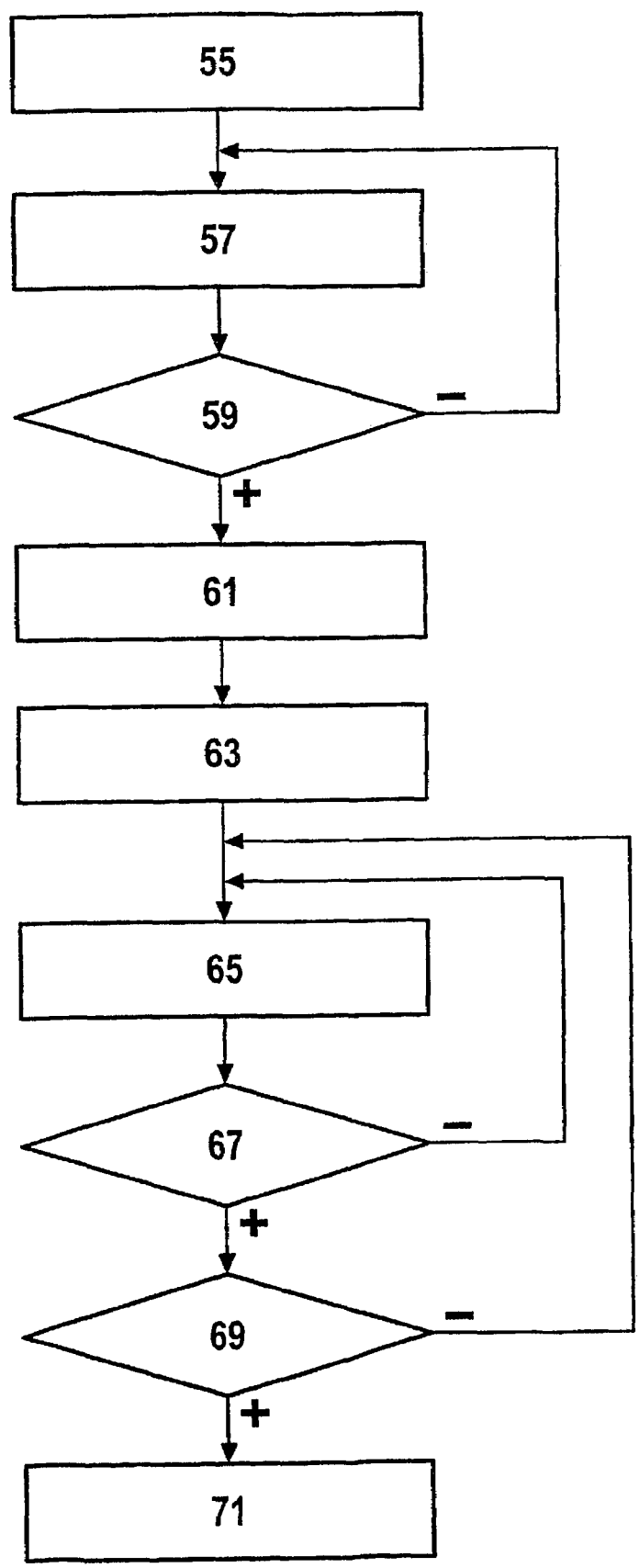

Exemplary embodiments of the invention are explained in more detail with reference to three figures, in which:

FIG. 1 diagrammatically depicts a fuel cell system with a venturi nozzle in a drainage line, FIG. 2 diagrammatically depicts a venturi nozzle with connected differential-pressure sensor, FIG. 3 shows a process flowchart for the disposal of water and inert gas from a fuel cell block.

FIG. 1 shows a cascaded fuel cell block 1 which is divided into three cascade stages 1A, 1B and 1C and which has what is known as a "purge cell" 1D. The fuel cell block 1 is what is known as a closed or dead end fuel cell block, which is designed for substantially exhaust-gas-free operation. The fuel cell block comprises PEM fuel cells and is used to supply power to a drive motor of a submarine.

While the fuel cell block 1 is operating, oxygen ($O_2$) is fed through the line 3 to a humidifier 5, which is designed as a surface humidifier. The humidified oxygen is then passed into the first cascade stage 1A of the fuel cell block 1, where it passes through a number of PEM fuel cells. The product water ($H_2O$) from the first cascade stage 1A is fed to a water separator 9 through the line 7. In the water separator 9, water and oxygen are separated. The oxygen is fed back into the first cascade stage 1A via the line 11. The water is returned to the humidifier 5 through the line 13. A valve 15 for blocking the line 13 is arranged in the line 13.

As it moves onward, the oxygen from cascade stage 1A flows into cascade stage 1B, which again comprises a plurality of PEM fuel cells. The water which collects in cascade stage 1B is passed into a water separator 17, in which water and oxygen are separated. The oxygen is returned to the first cascade stage 1A through the line 19, and the water is discharged through the line 21 to a venturi nozzle 23, through this nozzle and, by means of the drainage line 25, is fed for further use. A differential pressure sensor 27 is connected to the venturi nozzle 23. The water which collects in the third cascade stage 1C is passed into the water separator 29, which is likewise connected to the venturi nozzle 23 by the line 31. While the fuel cell block 1 is operating, water, inert gases and contaminating gases collect in the purge cell 1D. They are likewise passed to the venturi nozzle 23 through the line 33.

When it is necessary to drain the water separators 17 or 29 or the purge cell 1D, the valve 35, 37 or 39 opens, so that the water flows out of the water separators 17 or 29 or out of the purge cell, together with inert and contaminating gas, through the corresponding valve 35, 37, 39 and the venturi nozzle 23. The differential pressure sensor 27 is now used to monitor which phase is flowing through the venturi nozzle. If sufficient gas has flowed through the venturi nozzle 23, monitoring electronics, which are not shown in more detail in FIG. 1 and are connected to the differential pressure sensor and the valves 35, 37 and 39, close the valve which is currently open.

In the event that all the valves 15, 35, 37, 39 need to be closed and the differential pressure sensor 27 signals a differential pressure which is higher than a limit pressure for a period of time which is longer than a limit period of time, the monitoring electronics cause the fuel cell block 1 to be shut down. The limit pressure is 10 mbar. The limit period of time is 3 sec. Since the fuel cell system of which the fuel cell block 1 forms part is used to supply power to an electric drive unit of a submarine, acceleration forces act on the differential pressure sensor 27. There is always some water, sometimes more, sometimes less, splashing around in the lines from the venturi nozzle 23 to the differential pressure sensor 27, and consequently acceleration of the differential pressure sensor 27 simulates a differential pressure in the venturi nozzle.

Experience has shown that this differential pressure amounts to less than 5 mbar. Stronger accelerations or measurement errors also lead to differential pressures or to simulated differential pressures which are higher than 10 bar for a short time. Therefore, the monitoring electronics wait for a limit time of 3 sec, during which period the differential pressure must be over 10 mbar, before shutting down the fuel cell block 1.

FIG. 2 shows a venturi nozzle 40 which is arranged in a drainage line 41 of a fuel cell block. While the fuel cell block is operating, with the shut-off valve inside the drainage line 41 open, a liquid or gas stream flows in the direction of flow 42. The stream is accelerated upstream of the zone 43 with the narrowest cross section. Within the zone 43, the gas or liquid flows at an increased velocity, with the result that the measured or "static" pressure in the zone 43 is lower than the pressure in the zone 45 upstream of the narrowing of the venturi nozzle 40. Lines 49 and 51 lead from the zone 45 or 43, respectively, to a differential pressure sensor 53. This differential pressure sensor 53 measures the differential pressure between the pressures of the gas or liquid in zones 45 and 43. The differential pressure sensor 53 is designed for a pressure of up to at most 4 bar. The measurement range of the differential pressure sensor 53 ranges from 0 to 1 bar. The differential pressure sensor 53 measures particularly sensitively and therefore particularly accurately in the range between 0 and 100 mbar. Suitably designing the zone 43 (for example 5% of the cross-sectional area through which medium flows in zone 45) ensures that not very much gas passes through the narrow zone 43 within a defined safety period, for example the 3 sec. This prevents significant quantities of gas from passing through the venturi nozzle irrespective of circumstances.

FIG. 3 shows a flowchart of a method for monitoring the discharge of media from a fuel cell. In a first process step 55, a drainage valve of the fuel cell is opened. Then, water flows through a venturi nozzle in the drainage line, and at the same time the differential pressure in the venturi nozzle is measured 57 by a differential pressure sensor and transmitted to monitoring electronics. The monitoring electronics check 59 whether there are sudden changes of a predetermined nature in the temporal profile of the differential pressure. A sudden change of this type is an indicator that a liquid-gaseous phase transition is passing through the venturi nozzle. If no such sudden change has occurred (−), the differential pressure continues to be measured and transmitted 57 to the measurement electronics. If a sudden change of a defined nature has occurred (+), the monitoring electronics wait 61 for a preprogrammed time before emitting 63 a signal to close the drainage valve.

The differential pressure continues to be measured by the differential pressure sensor, and the measured value is transmitted 65 to the monitoring electronics, which check 67 the magnitude of the measured value. If the value is below a preprogrammed threshold (−), the differential pressure continues to be measured and transmitted 65 to the measurement electronics. If the value is above the threshold (+), the monitoring electronics check the temporal profile of the differential pressure 69. If the profile is not critical (−), for example if the differential pressure was only above the threshold for a brief period of time, the differential pressure continues to be measured and transmitted 65 to the monitoring electronics. If the profile is critical (+), the monitoring electronics transmit a signal 71 to shut down the fuel cell system.

The invention claimed is:

1. A fuel cell system, comprising:
   a fuel cell block; and
   an outlet line for discharging water, exhaust gas and inert gas from the fuel cell block, a venturi nozzle with a differential pressure sensor and a controllable valve being arranged in the outlet line,
   wherein the controllable valve is closed when the differential pressure sensor detects a differential pressure undergoing sudden changes.

2. The fuel cell system as claimed in claim 1, wherein the fuel cell block is a closed fuel cell block.

3. The fuel cell system as claimed in claim 2, wherein the fuel cell block includes PEM fuel cells.

4. The fuel cell system as claimed in claim 2, wherein the fuel cell system is used as a power supply for an electrical unit in a submarine.

5. The fuel cell system as claimed in claim 4, wherein the fuel cell system is used as a drive unit of the submarine.

6. The fuel cell system as claimed in claim 1, wherein the fuel cell system is used as a power supply for an electrical unit in a submarine.

7. The fuel cell system as claimed in claim 6, wherein the fuel cell block includes PEM fuel cells.

8. The fuel cell system as claimed in claim 6, wherein the fuel cell system is used as a drive unit of the submarine.

9. The fuel cell system as claimed in claim 8, wherein the fuel cell block includes PEM fuel cells.

10. The fuel cell system as claimed in claim 1, wherein the fuel cell block includes PEM fuel cells.

11. The fuel cell system as claimed in claim 1, wherein the fuel cell block is shut down when the differential pressure of the fuel cell system is above a limit pressure and the controllable valve is closed.

12. The fuel cell system as claimed in claim 1, wherein the venturi nozzle is a closure indicator for the controllable valve.

13. The fuel cell system as claimed in claim 1, wherein the venturi nozzle is a monitoring-means for the controllable valve.

14. A fuel cell system, comprising:
    a fuel cell block; and
    an outlet line for discharging water, exhaust gas and inert gas from the fuel cell block, a venturi nozzle with a differential pressure sensor and a controllable valve being arranged in the outlet line,
    wherein the controllable valve is closed by a controller after a gas has passed through the controllable valve.

* * * * *